April 3, 1934.   J. E. WAGGONER   1,953,639
COTTON PICKER
Filed April 14, 1930   2 Sheets-Sheet 1
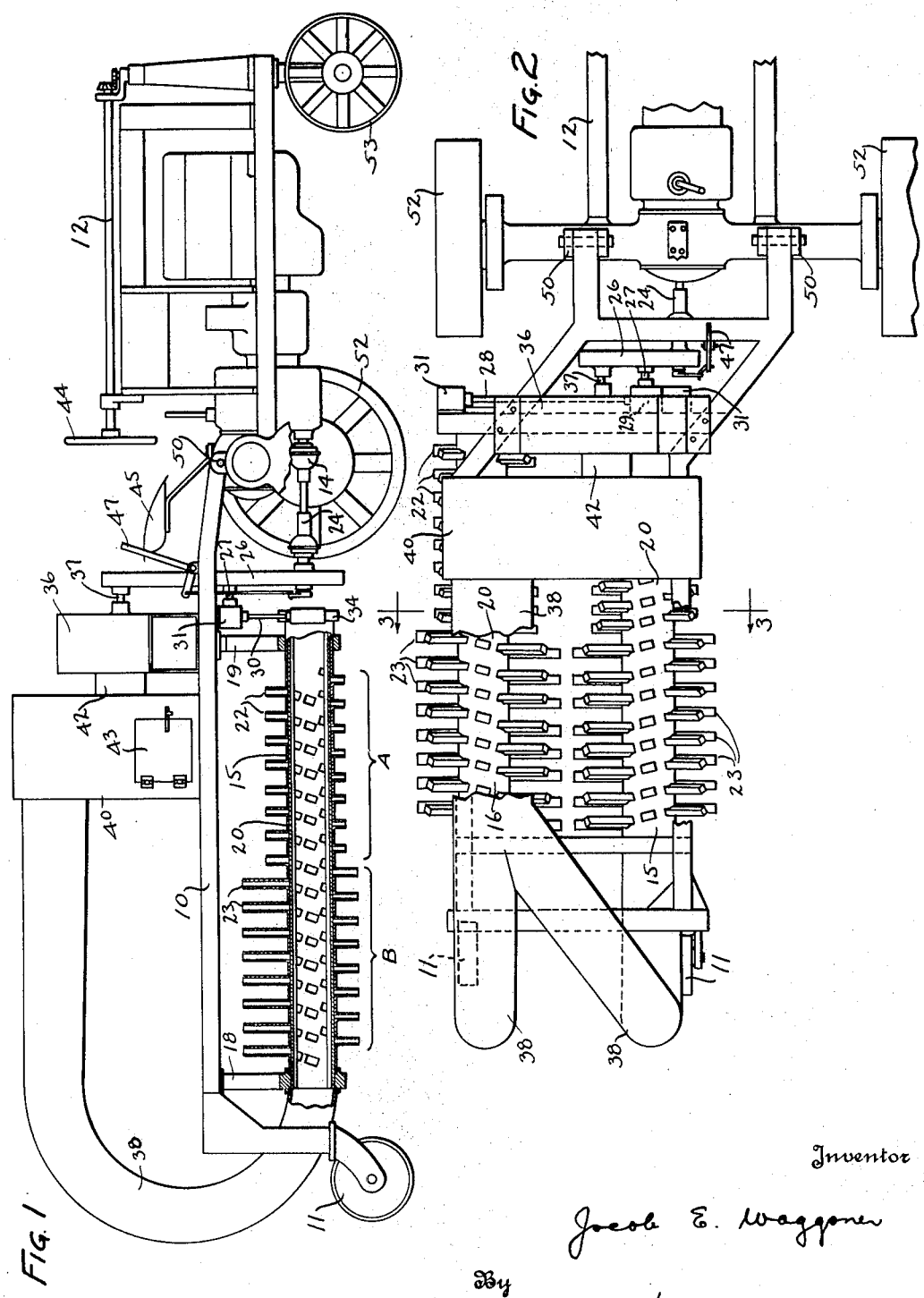
Inventor
Jacob E. Waggoner
By
Marechal and Roe
Attorneys April 3, 1934.  J. E. WAGGONER  1,953,639
COTTON PICKER
Filed April 14, 1930  2 Sheets-Sheet 2

Inventor
Jacob E. Waggoner
By Maréchal and Noe
Attorney

Patented Apr. 3, 1934

1,953,639

UNITED STATES PATENT OFFICE 1,953,639

COTTON PICKER

Jacob E. Waggoner, Dayton, Ohio

Application April 14, 1930, Serial No. 444,100

11 Claims. (Cl. 56—12)

This invention relates to cotton pickers.

One of the principal objects of the invention is the provision of a cotton picker which is simple in construction, effective in its operation, and of large picking capacity.

Another object of the invention is the provision of a cotton picker which is a compact self contained unit readily controllable by a single operator.

A further object of the invention is the provision of a cotton picker comprising a plurality of movable picking members which are automatic in their action, and are adapted to reach the entire cotton plant from which the cotton is removed by suction.

Other objects and advantages of the invention will be apparent from the following description, the accompanying drawings and the appended claims.

In the drawings, in which like characters of reference designate like parts throughout the several views thereof,—

Fig. 1 is a side elevational view of a cotton picker constructed in accordance with this invention, in which several of the parts are shown in section;

Fig. 2 is a plan view of a cotton picker with some of the parts removed for purposes of illustration;

Figure 3:
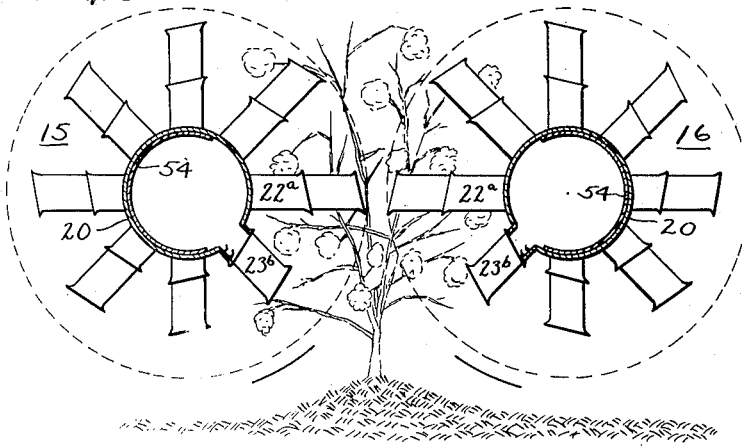
Fig. 3 is an enlarged sectional view of the picking units, the section being taken on the plane of the line 3—3 of Fig. 2.
Figure 5:
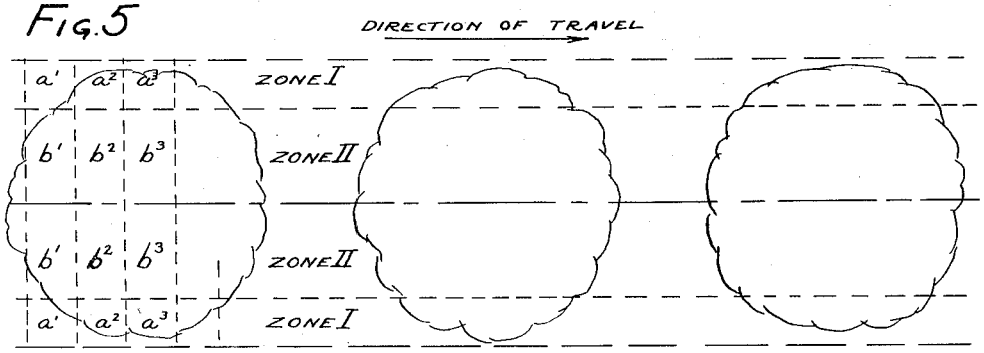
Fig. 5 is a diagram illustrating the travel of the picking members.
Figure 4:
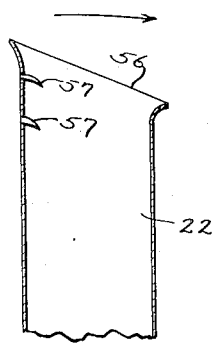
Fig. 4 is an enlarged sectional view of one of the picking members.

In the drawings, which discloses a preferred embodiment of the invention, the cotton picker comprises a frame 10 upon which the picking mechanism is carried, the frame being supported for travelling movement upon suitable wheels 11 and provided with propelling means such as a tractor 12. The tractor, in addition to providing the propelling means for the frame 10, is also adapted to provide power for the actuation of the picking mechanism, a suitable power take-off 14 being provided upon the tractor to which driving connection with the picking mechanism is established. The picking mechanism comprises a plurality of pickng units which are suspended from the frame 10 as by means of the brackets 18 and 19. The picking units preferably comprise hollow cylindrical members 20 which are shown journalled for rotational movement within the brackets 18 and 19, and are provided with a plurality of radially extending hollow picking members 22 and 23; one member 20 and its associated picking members comprising a unit, two of which are shown and designated by the numerals 15 and 16. The picking units are preferably provided in pairs; the units being relatively positioned so that the picking members may reach inwardly from opposite sides toward the center of a row of cotton plants as the picker is driven through the field. A fan is provided on the picker for creating suction within the picking members so that as the members 22 and 23 come into contact with the cotton it will be drawn into the open ends of the picking members and thence into a suitable receiver from which it may be subsequently removed. The picking members are preferably mounted upon the members 20 in spiral flight formation; the flights being so arranged that during the operation of the picker the picking members will cover the entire cotton plant.

Any suitable driving means may be provided between the power take-off of the tractor 12 and the members 20 for their rotation such as a chain and sprocket or a gear drive. As shown a driving connection 24 is provided between the power take-off 14 of the tractor and a gear train which is mounted upon the frame 10 and provided within the gear box 26. The driving connection 24 is of conventional form incorporating universal joints and a slip joint, such as a spline, whereby freedom of movement is permitted between the parts connected to the ends of this driving connection. As the driving connection 24 as well as the arrangement of gearing in the housing 26 comprise constructions which are well known, it is thought that further description or illustration is unnecessary to afford a complete understanding of the operation of the device. A driving shaft 27 is provided upon one of the gears within the gear box 26 and extends therefrom to drive the cross shaft 28; suitable gearing being provided within the housing 29. The shaft 28 in turn drives the shafts 30, one of which is preferably provided for each of the picking units. Suitable gear drives between the shaft 28 and the shafts 30 are provided within the housings 41 while the opposite ends of the shafts 30 are in driving connection with the members 20 of the picking units for their rotation by means of suitable worm and worm gears contained in housings 34; the gearing being preferably arranged to rotate the adjacent members 20 in opposite directions. Means are also provided within the housing 26 for operating the fan 36 for which a driving connection 37 is provided. The fan 36 is provided with suitable pipe connections which provide communication between the suction side of the fan and the rotatable members 20 and hollow picking members 22, 23 which are fixed thereto. Upon actuation of the mechanism the cotton which comes in contact with the open ends of the picking members will be drawn by suction in through the hollow picking members, through the members 20, and communicating passage 38 into the receiver 40 where it will be retained but through which the air may pass by means of a suitable screen and a pipe connection 42 into suction fan 36. Access to the receiver is provided as by means of the door 43 through which the picked cotton may be removed.

The tractor 12 which provides propelling means for moving the picker through the cotton field is provided with a steering control 44 adjacent the operator's station 45 so that the machine may be guided in proper picking relation to the plants. A control means such as the handle 47 is provided within reach of the operator for connecting the picking mechanism to the tractor. The propelling means may be provided as an integral part of the picker frame 10 or, as shown, may be attached as by means of the pivotal connection 50 which permits freedom of movement in a vertical plane between the tractor 12 and frame 10 to accommodate the mechanism to unevenness in the ground surface but, being rigid in a horizontal plane, causes the frame 10 to be guided with the tractor so that the operator need only steer the tractor to maintain the picking units in correct picking relation to the cotton plants. The picking units 15 and 16 are so positioned with respect to the wheels 11 of the frame and the wheels 52 and 53 of the tractor that when the wheels are running between the rows of plants the picking units will reach in from opposite sides toward the center of the plants.

As shown, particularly in Fig. 3, the picking members 22 and 23 are arranged to extend radially from the members 20. These are preferably positioned or grouped in a succession of flights, each flight comprising a series of spirally arranged picker members, the members in each series being of progressively increasing length and arranged in a spiral formation about the circumference of the member 20. The pitch of the spiral in which each series of picking members is arranged is predetermined with respect to the power take-off mechanism, so that the speed of rotation of the picking units will be coordinated with the speed of lineal travel of the machine and as a result the several picking members of a flight will move in such paths that the various picking members of such a flight will have an effective picking action within a given zone along the cotton plants; the members in each series being so cooperatively arranged that each such series will pick within a given area across the cotton plant. The several flights are also arranged with progressively greater lengths, so that the picking members 22 of the first flight, designated as group A, will pick within a zone I extending in from the surface of the plant to a point approximately three inches in from the surface; and the picking members 23 of the second flight, designated as group B, will pick within a zone II extending inwardly, further, to the central line of the plant. The series of picking members of the flights are, as mentioned, adapted to pick within a given area across the cotton plant; adjacent series of flight A, for example, will pick within adjacent areas as designated $a1$, $a2$, $a3$ etc. while adjacent series of flight B are adapted to pick within areas indicated $b1$, $b2$, $b3$ etc.

The series and flights are so arranged that upon rotation of the picking units the entire cotton plant will be covered. Any desired number of flights may be provided; the members being arranged so that the longest member of a preceding flight and the shortest member of an adjacent following flight will continue the progression of increasing length. As illustrative of this manner of positioning, the members of flight A increase in length to the longest member of this group, designated $22^a$. The shortest member, designated $23^b$, of the next adjacent flight (group B) being somewhat longer than the member $22^a$ and the following members 23 of this flight are progressively of greater length than the member $23^b$. This progression may be continued to provide any desired picking range, and the range of picking may be divided among any desired number of flights; that is, instead of the two flights as shown, three or more flights may be provided. The picking members may, if desired, be divided among the several flights in proportion to the picking demands of the several zones.

It will be understood that the major divisions of pickers, designated as flights and indicated as A and B, pick within zones spaced transversely of the direction of travel of the machine. Each flight comprises a plurality of series of pickers which pick within adjacent areas of a zone; the areas extending in the direction of travel and being of full zone depth. A series, which in the illustrated embodiment of the invention is shown as pickers arranged in one spiral turn and of progressively increasing length around the circumference of the supporting structure, is duplicated a number of times to provide a flight. The series are axially spaced so that they traverse spiral lines of travel which are intertwined in the form of a multiple thread screw. The axially aligned pickers of the several series constituting a flight are the same length; the length difference among the pickers of a flight being between the angularly related pickers. Also, the same length difference exists between the longest pickers of a preceding flight and the shortest pickers of a succeeding flight as exists between adjacent angularly related pickers of a flight.

Means are provided within the members 20 to limit the suction action to those members actually lying within the zone within which actual picking occurs. As shown, semi-circular longitudinally extending plates 54 are provided within the members 20 and are supported by the brackets 18 and 19 in close engagement with the interior surface of the members 20. The open portion of each of the members 54 coincides with the area within which the picking members contact with the cotton and in this manner the plates restrict the suction to only those picking members which are in working position.

The picking members 22 are preferably provided at the open or picking end with a bell mouthed opening 56, the opening being inclined in the direction of travel of the picking member. Suitable barbs 57 may be fixed within the picking member adjacent the open end and are preferably turned inwardly so that when the cotton is drawn into the open end of the picking members under suction the barbs 57 will embed themselves within the cotton to thus provide a positive means of disengaging the cotton from the plant after which the cotton is readily drawn through the picking members 22 under action of the suction created by the fan 36.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A cotton picker comprising in combination a mobile supporting frame, propelling means therefor, picking means supported by said frame, means for actuating said picking means, said picking means comprising groups of flights of picking members arranged so that each flight group effects picking within a predetermined zone, the members of each flight being of progressively increasing length and the shortest member of a succeeding group being longer than the longest member of a preceding group.

2. A cotton picker comprising in combination a mobile supporting frame, propelling means therefor, picking means supported by said frame, means for actuating said picking means, said picking means comprising a plurality of picking units arranged to operate on opposite sides of a cotton plant, said picking units comprising a plurality of flights of picking members, each flight having the picking members arranged of progressively increasing length and adapted upon actuation to reach progressively from the surface to the center of the plant.

3. A cotton picker comprising in combination a wheeled supporting frame, propelling means therefor, picking means supported by said frame, said picking means comprising open ended tubular members rotatable on an axis forwardly directed with respect to the direction of travel of the picker and positioned perpendicular with respect to said axis, a driving connection between said propelling means and said picking unit, said driving connection being adapted to effect a predetermined relationship between the speed of rotation of said picking unit and the rate of forward travel of said picker.

4. A cotton picker comprising in combination a mobile supporting frame, propelling means therefor, picking means supported by said frame, means for actuating said picking means, said picking means comprising open ended tubular members rotatable on an axis forwardly inclined with respect to the direction of travel of the picker and positioned perpendicularly with respect to said axis, a plurality of flight groups of picking members positioned upon said picking unit, the picking members of adjacent groups being of progressively greater length than the members of the preceding group.

5. A cotton picker comprising in combination a mobile supporting frame, propelling means therefor, picking means supported by said frame, means for actuating said picking means, said picking means comprising a plurality of rotatable picking units, a plurality of flights of picking members positioned upon said picking units, each of said flights comprising a series of picking members, adjacent picking members of said series being of progressively increasing length and arranged to present picking members of successively greater length during rotation of said picking unit, said adjacent flights being of different lengths, the lengths of the several flights increasing progressively from front to back of the machine.

6. In a cotton picker, picking means comprising a traveling supporting member, a rotatable member mounted upon said supporting member and having a plurality of hollow picking members secured thereto and in communication therewith, said picking members being of varying length and arranged to follow one another to reach progressively increasing distances from the rotatable member.

7. A cotton picker comprising in combination a mobile supporting frame, propelling means therefor, movable picking means supported by said frame, means connecting the propelling means and said picking means for coordinated movement, said picking means comprising a group of flights of open ended picking members of progressively varying length, the members of a group having the open picking ends spirally positioned to pick progressively outwardly with respect to the picking means upon movement of the propelling means.

8. A cotton picker comprising in combination a mobile supporting frame, propelling means therefor, picking means supported by said frame, said picking means comprising a member rotatable upon an axis extending forwardly with respect to the travel of the picker, means connecting said propelling means and picking means for coordinated movement, a group of flights of open ended picking members of progressively increasing length upon said rotatable member, the picking members of a group having the open picking ends spirally positioned to pick progressively increasing distances from the axis of rotation of the picking means upon movement of the propelling means.

9. A cotton picker comprising in combination a mobile supporting frame, propelling means therefor, picking means supported by said frame, said picking means comprising a plurality of members rotatable upon axes extending forwardly with respect to the travel of the picker and arranged to operate on opposite sides of a cotton plant, means connecting said propelling means and picking means for coordinated movement, a group of flights of open ended tubular picking members positioned upon each of said rotatable members, the picking members of a group being of progressively varying length and having spirally arranged open ends positioned to pick progressively increasing distances from the axes of rotation of the picking means upon movement of the propelling means.

10. A cotton picker comprising in combination a mobile supporting frame, propelling means therefor, picking means supported by said frame, means for actuating said picking means in timed relation to the propelling means, said picking means comprising a rotatable unit having open ended picking members secured thereto and extending radially therefrom, said picking members being arranged spirally on said unit and adapted upon actuation to pick within predetermined areas spaced progressively outwardly with respect to the picking means.

11. A cotton picker comprising in combination a mobile supporting frame, propelling means therefor, picking means supported by said frame, means for actuating said picking means in timed relation to the movement of the propelling means, said picking means comprising a rotatable member, a plurality of open ended tubular picking members attached thereto, said picking members being arranged spirally about said rotatable member and coordinated in positioning and pitch with respect to the movement of the picker to follow one another in a helical path extending in the direction of travel of the picker.

JACOB E. WAGGONER.